United States Patent [19]

Matsui et al.

[11] Patent Number: 5,016,158

[45] Date of Patent: May 14, 1991

[54] PARALLEL MULTI-INVERTER SYSTEM AND MOTOR DRIVE SYSTEM USING THE SAME

[75] Inventors: Takayuki Matsui, Hitachi; Toshiaki Okuyama, Ibaraki; Kazuaki Tobari, Mito; Yuzuru Kubota, Hitachi; Junichi Takahashi, Katsuta, all of Japan

[73] Assignee: Hitachi, Ltd., Tokyo, Japan

[21] Appl. No.: 544,392

[22] Filed: Jun. 27, 1990

[30] Foreign Application Priority Data

Jun. 30, 1989 [JP] Japan .................................. 1-166657

[51] Int. Cl.[5] .......................................... H02M 7/521
[52] U.S. Cl. ........................................ 363/71; 363/40; 363/72
[58] Field of Search ........................ 363/39, 41, 71, 72; 318/812

[56] References Cited

U.S. PATENT DOCUMENTS

| | | |
|---|---|---|
| 3,876,923 | 4/1975 | Humphrey et al. .................. 363/71 |
| 3,916,290 | 10/1975 | Rao et al. ............................... 363/72 |
| 3,979,662 | 9/1976 | Klein ..................................... 363/41 |

FOREIGN PATENT DOCUMENTS

| | | |
|---|---|---|
| 60-98875 | 6/1985 | Japan . |
| 64-47277 | 2/1989 | Japan . |

Primary Examiner—William H. Beha, Jr.
Assistant Examiner—Bruce Dunn
Attorney, Agent, or Firm—Antonelli, Terry, Stout & Kraus

[57] ABSTRACT

A parallel multi-inverter system including a plurality of inverters connected in parallel to each other through one or more parallel reactors, wherein output voltages of the inverters are controlled on the basis of the polarity of an output voltage command signal and a comparison result between a value obtained by converting the output voltage command signal into a positive one and a carrier signal to reduce harmonic components of the line-to-line voltages, and further two different switching modes to set the output voltage of the system zero are equally used to prevent a circulating current from flowing through the parallel reactors during each zero potential period of the output voltage of the system.

3 Claims, 13 Drawing Sheets

| X1 | X2 | S1U | S2U | S3U | S4U | OUTPUT VOLTAGE |
|---|---|---|---|---|---|---|
| 0 | 0 | off | on | off | on | −E |
| 0 | 1 | off | on | on | off | 0 |
| 1 | 1 | on | off | on | off | +E |

FIG. 3

| X1 | X2 | X3 | X4 | Y1 | Y2 | S1U | S2U | S3U | S4U | OUTPUT VOLTAGE |
|---|---|---|---|---|---|---|---|---|---|---|
| ○ | ○ | ○ | — | ○ | ○ | off | on | off | on | −E |
| ○ | — | — | ○ | ○ | — | off | on | on | off | 0 |
| — | — | — | — | — | ○ | on | off | off | on | 0 |
| — | — | ○ | — | — | — | on | off | on | off | +E |

| SECTIONS | ZONE θ | U-PHASE "X5u" | V-PHASE "X5v" | W-PHASE "X5w" |
|---|---|---|---|---|
| A | −30°∼30° | 1 | 0 | 0 |
| B | 30°∼90° | 1 | 1 | 0 |
| C | 90°∼150° | 0 | 1 | 0 |
| D | 150°∼210° | 0 | 1 | 1 |
| E | 210°∼270° | 0 | 0 | 1 |
| F | 270°∼330° | 1 | 0 | 1 |

PARALLEL MULTI-INVERTER SYSTEM AND MOTOR DRIVE SYSTEM USING THE SAME

BACKGROUND OF THE INVENTION

The present invention relates to a parallel multi-inverter system including a plurality of pulse width modulation inverters which can suppress harmonic components of an output voltage and also can prevent a circulating current flowing through reactors connected between the inverters, and also relates to a motor drive system using the parallel multi-inverter system.

When it is desired to control the rotational speed of an AC motor, a pulse width modulation (PWM) inverter system is often employed. The PWM inverter system, however, has such a problem that since the output voltage of the PWM inverter system has two levels of positive and negative, harmonic components contained in the output voltage are much.

For the purpose of avoiding the above problem, there have been suggested systems for connecting a plurality of inverters on a multiple basis to eliminate such harmonic components from the output voltage. For example, one of such conventional harmonic eliminating systems is disclosed in JP-A-60-98875 wherein a plurality of voltage-source PWM inverters are connected in parallel to each other through a plurality of parallel reactors so that the phase of a carrier signal for controlling the respective inverters is sequentially shifted by 360°/n (n: the number of inverters) to thereby reduce side bands harmonic components of the carrier signal.

Also proposed in JP-A-64-47277 is such a system that a modulation signal having two output levels of positive and negative with respect to a reference potential is generated, first and second carrier signals respectively having amplitudes positive and negative with respect to the reference potential are generated, and the first and second carrier signals are compared with the modulation signal, so that a plurality of switching elements connected in series with each other are driven in accordance with a signal indicative of the comparison results to thereby remove harmonic components.

The above prior art systems can suppress the harmonic components of respective phase voltages, but there has not been suggested yet such a parallel multi-inverter system that a plurality of unit inverters each made up of a plurality of switching elements are connected in parallel to each other through parallel reactors so as to reduce the harmonic components of line-to-line voltages of the system and also to prevent a circulating current from flowing through the parallel reactors.

SUMMARY OF THE INVENTION

It is an object of the present invention to provide a parallel multi-inverter system which includes a plurality of inverters connected in parallel to each other through parallel reactors and which can suppress a circulating current from flowing in the system and also can reduce harmonic components contained in line-to-line voltages, whereby an AC output of less harmonic components can be supplied from the system to a load.

In order to attain the above object, in accordance with the present invention, a carrier signal is set to be positive, there are provided an absolute-value circuit for converting a negative side of an output voltage command signal into a positive one and a comparator for comparing an output of the absolute-value circuit with the biased carrier signal. Further, a polarity discriminating circuit for discriminating between the positive and negative of the output voltage command signal is provided to generate a positive output voltage when the output voltage command signal is positive and the output of the comparator is "1", generate a negative output voltage when the output voltage command signal is negative and the output of the comparator is "1", and generate a zero output voltage when the output of the comparator is zero, whereby the switching elements of the inverters are controllably turned ON and OFF to minimize the harmonic components. In addition, suppression of the circulating current flowing through the parallel reactors during zero period of the output voltage can be realized by controlling the ON and OFF operation of the switching elements of the inverters to switch between the polarity of output voltages of the inverters.

The magnitude of harmonics of the output current of the parallel multi-inverter system is proportional to the magnitude of harmonics contained in line-to-line voltages. The magnitude of harmonic components of the line-to-line voltages is changed by varying relationships between the respective phase of output pulse voltages of the inverters. Accordingly, harmonic component voltages contained in the line-to-line voltages of the parallel multi-inverter are varied with the pulse width modulation system of the parallel multi-inverter system. More specifically, the output voltage of the system is controlled by comparing the absolute value of the output voltage command signal to the inverters with the positive-biased carrier signal and by controlling the ON and OFF operation of the switching elements of the inverters in response to the compared result and the polarity of the command signal. When a plurality of carrier signals are employed, it is usually necessary to control the carrier signals to be in phase with each other. Even in this case, when the present invention is arranged as mentioned above, the need for taking the phase shift of the carrier signals into consideration can be eliminated.

In addition, the circulating current can be prevented from flowing through the parallel reactors during zero period of the output voltage by alternatively switching between the polarity of output voltages of the inverters.

BRIEF DESCRIPTION OF THE DRAWINGS

FIG. 11 is an arrangement of a further embodiment of the parallel multi-inverter system of the present invention to suppress a circulating current;

DESCRIPTION OF THE PREFERRED EMBODIMENTS

Figure 1:
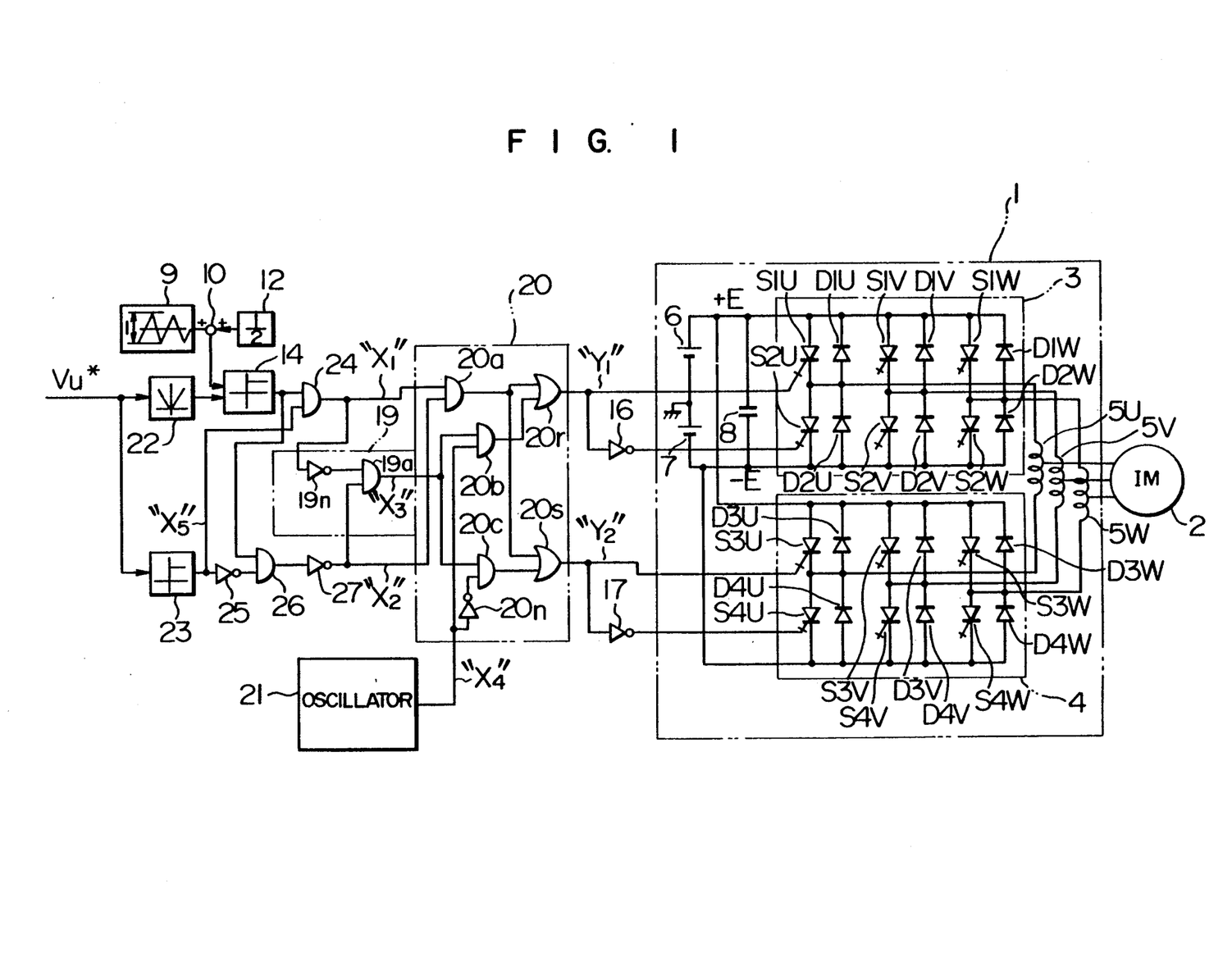
FIG. 1 shows an arrangement of a first embodiment in accordance with the present invention.

Referring to FIG. 1, there is shown an embodiment of the present invention, wherein a parallel multi-inverter 1 converts a DC voltage into AC voltages having three levels of positive, 0 and negative (three-phase voltages) and supplies the three-phase AC voltages to an AC motor 2.

The parallel multi-inverter 1 includes three-phase inverters 3 and 4. In the parallel multi-inverter 1, a smoothing capacitor 8 is connected in parallel to DC power sources 6 and 7 connected in series with each other, and the three-phase inverters 3 and 4 are connected in parallel to the capacitor 8. The DC power sources 6 and 7 are directly connected at their one ends (junction point) and the junction point is grounded.

The three-phase inverter 3 comprises series circuits of self turn-off type switching elements S1U and S2U, S1V and S2V, and S1W and S2W, series circuits of feedback diodes D1U and D2U, D1V and D2V, and D1W and D2W; the switching element series circuits being connected in parallel to the adjacent feedback diode series circuits in polarity directions opposite to each other, respectively.

The three-phase inverter 4, like the three-phase inverter 3 comprises series circuits of self turn-off type switching elements S3U and S4U, S3V and S4V, and S3W and S4W, series circuits of feedback diodes D3U and D4U, D3V and D4V, and D3W and D4W; the switching element series circuits being connected in parallel to the adjacent feedback diode series circuits in polarity directions opposite to each other, respectively.

As the self turn-off type switching elements, transistors, gate-turn-off thyristors or the like elements can be used. The three-phase inverters 3 and 4 are also connected at their AC phase (U, V, W) output terminals to both ends of parallelly-connected reactors 5U, 5V and 5W each having a center tap. The parallel reactors 5U, 5V and 5W are connected at their center taps with an AC motor 2.

Explanation will next be made as to the arrangement and operation of the PWM control system used in the present invention. For abbreviation of explanation, explanation will be made as to only the U phase, but it will be appreciated that the same arrangement and operation hold true for the V and W phases.

In FIG. 1, a carrier generator 9 is provided to generate a triangle or saw-tooth shaped carrier wave and send the carrier to a bias circuit 120 of a constant multiplier 12 and an adder 10 for positive biasing. An absolute-value circuit 22 receives an output voltage command signal $V_U^*$ from a voltage command generator (not shown) which commands an output voltage, and converts the output voltage command signal $V_U^*$ into a positive signal that is then supplied to a comparator 14. The comparator 14 also receives an output of the bias circuit 120 in addition to the above positive signal from the bias circuit 22 and compares the received signals. A polarity discriminating circuit 23 functions to discriminate between positive and negative parts of the output voltage command signal $V_U^*$ and outputs "1" when the output voltage command signal $V_U^*$ is positive and "0" when the output voltage command signal $V_U^*$ is negative or zero. A first signal generating means comprises an AND circuit 24 which generates an output "1" when the polarity discriminator 23 generates an output signal "1" (positive) and the comparator 14 generates an output signal "1". A second signal generating means comprises a NOT circuit 25 for inverting its output signal when the polarity discriminator 23 discriminates negative or zero, an AND circuit 26 for generating an output "1" when the NOT circuit 25 generates an output signal "1", and a NOT circuit 27 for inverting the output of the AND circuit 26.

Figure 2:
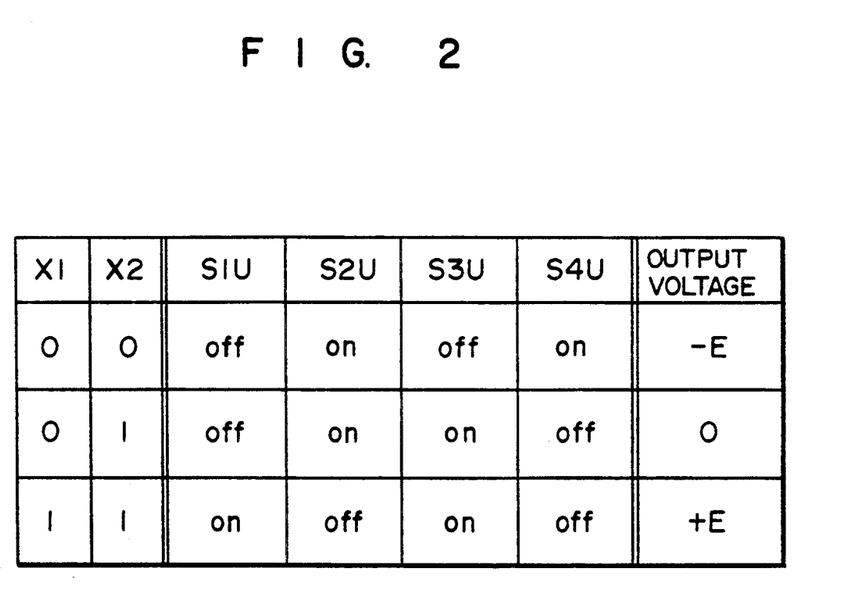
FIG. 2 is a diagram showing relationships between an output voltage and the ON and OFF states of switching elements with respect to the states of outputs of first and second signal generating means.
Figure 2:
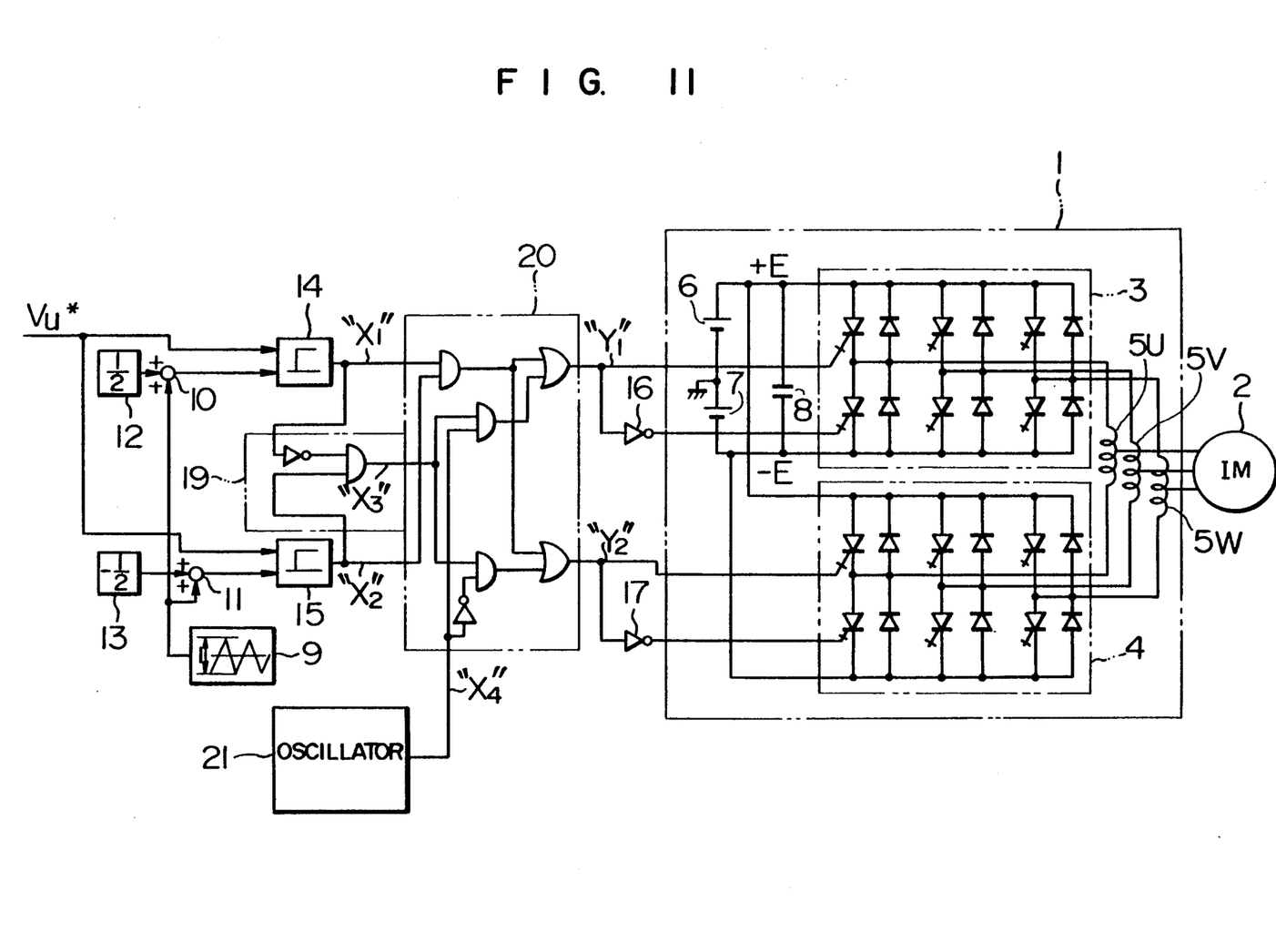

The above operation is summarized as shown in FIG. 2. More specifically, the switching elements S1U and S3U are turned ON and the switching elements S2U and S4U are turned OFF in the inverters 3 and 4 so that, when outputs X1 and X2 of the first and second signal generating means are both "1", the parallel multi-inverter 1 generates a positive output voltage +E. The switching elements S1U and S3U are turned OFF and the switching elements S2U and S4U are turned ON in the inverters 3 and 4 so that, when the outputs X1 and X2 of the first and second signal generating means are both "0", the parallel multi-inverter 1 generates a negative output voltage −E. Further, the switching elements S1U and S4U are turned OFF and the switching elements S2U and S3U are turned ON in the inverters 3 and 4 so that, when one of the outputs X1 and X2 of the first and second signal generating means is "1" and the other is "0", the parallel multi-inverter 1 generates the negative output voltage zero.

Under the above condition, when one of the outputs X1 and X2 of the first and second signal generating means is "1" and the other is "0", a circulating current flows through the parallel reactor 5U, which results in that the power loss becomes large. For the purpose of preventing the circulating current, as shown in FIG. 1, logical operation circuits 19 and 20 and an oscillator 21 are provided so that, under the above condition, a mode to turn ON the switching elements S1U and S4U and a mode to turn OFF the switching elements S2U and S3U are equally used.

In more detail, the logical operation circuit 19 comprises a NOT circuit 19n for inverting the output signal of the first signal generating means and an AND circuit 19a for generating an output "1" when the output of the second signal generating means and an output of the NOT circuit 19n are both "1". The logical operation circuit 20 comprises an OR circuit 20r, an AND circuit 20a for generating an output "1" when the output signals of the first and second signal generating means are both "1's", an AND circuit 20b for generating an output "1" when an output X4 of the logical operation circuit 19 is "1" and an output of an oscillator 21 is "1", a NOT circuit 20n for inverting the output of the oscillator 21, an AND circuit 20c for generating an output "1" when an output of the NOT circuit 20n and the output of the logical operation circuit 19 are both "1's", and an OR circuit 20s for performing an OR operation between the outputs of the AND circuits 20a and 20c, so that outputs of the OR circuits 20s and 20r cause ON/OFF control of the respective switching elements of the multi-inverter 1.

The logical operation circuit 19 receives the output signals X1 and X2 of the first and second signal generating means and outputs an output X3 of "1" during only a zero-level period of the output voltage of the parallel multi-inverter 1, at which time the operational expression is as follows.

$$X3 = \overline{X1} \cdot X2 \quad (1)$$

Figure 3:
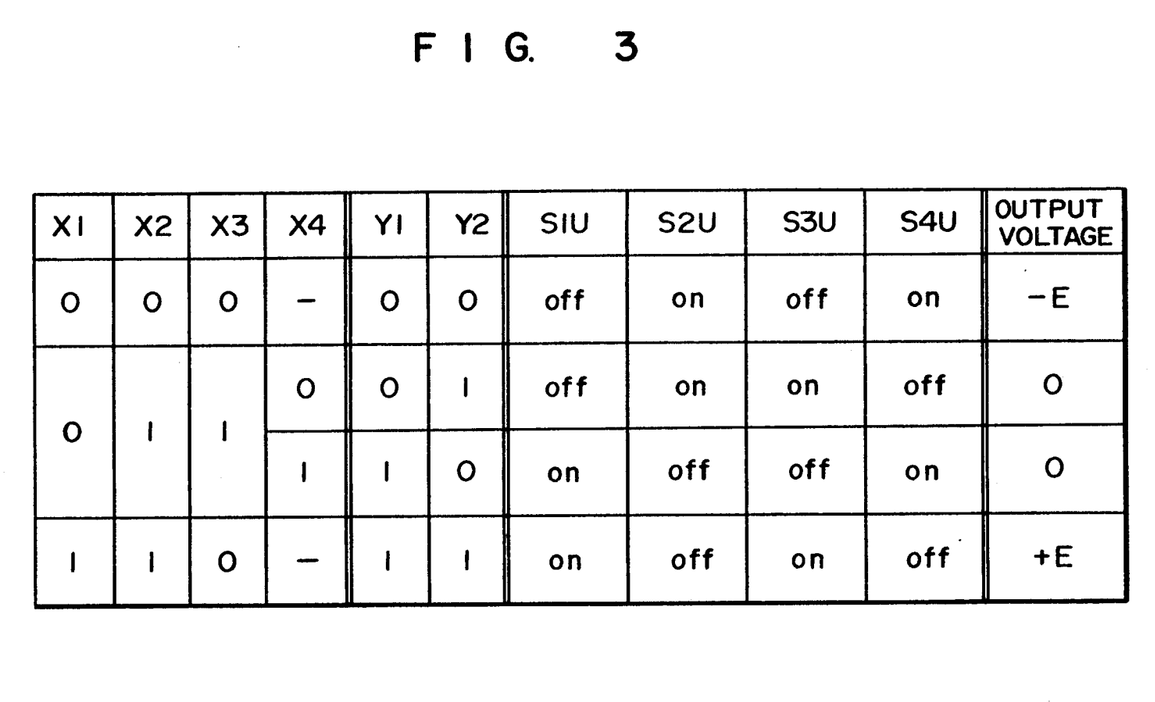
FIG. 3 is a diagram showing relationships between signal and the, output voltage when a circulatingcurrent suppressing circuit is added.

The logical operation circuit 20 receives the output signals X1 and X2 of the first and second signal generating means, the output signal X3 of the logical operation circuit 19 and the output signal X4 of the oscillator 21; and outputs pulse width modulation signals Y1 and Y2 which are used to turn the switching elements of the inverters 3 and 4 ON and OFF. The operational expression related with the above operation is expressed as follows and the truth table is shown in FIG. 3.

$$\begin{aligned} Y1 &= X1 \cdot X2 + X3 \cdot \overline{X4} \\ Y2 &= X1 \cdot X2 + X3 \cdot X4 \end{aligned} \quad (2)$$

The oscillator 21 cyclically outputs the signal X4 of "0" and "1" varying at a frequency lower than half of the frequency of the output signal of the carrier generator 9.

For example, when the oscillation frequency of the oscillator 21 is set to be half of the oscillation frequency of the generator 9 and their output signals are synchronized with respect to phase, the signal X4 of the oscillator 21 varies between "0" and "1" at a period corresponding to twice the carrier frequency of the generator 9. More in detail, during a zero-level period of the output voltage of the parallel multi-inverter 1, two modes are selected when the switching elements S2U and S3U are turned ON and the switching elements S1U and S4U are turned OFF for the signal X4 of "0" and when the switching elements S2U and S3U are turned OFF and the switching elements S1U and S4U are turned ON for the signal X4 of "1", as shown in FIG. 3. As a result, in accordance with the present invention, it becomes possible to suppress circulating current flowing the parallel reactor 5U, 5V, 5W between the inverters 3 and 4.

Figure 4:
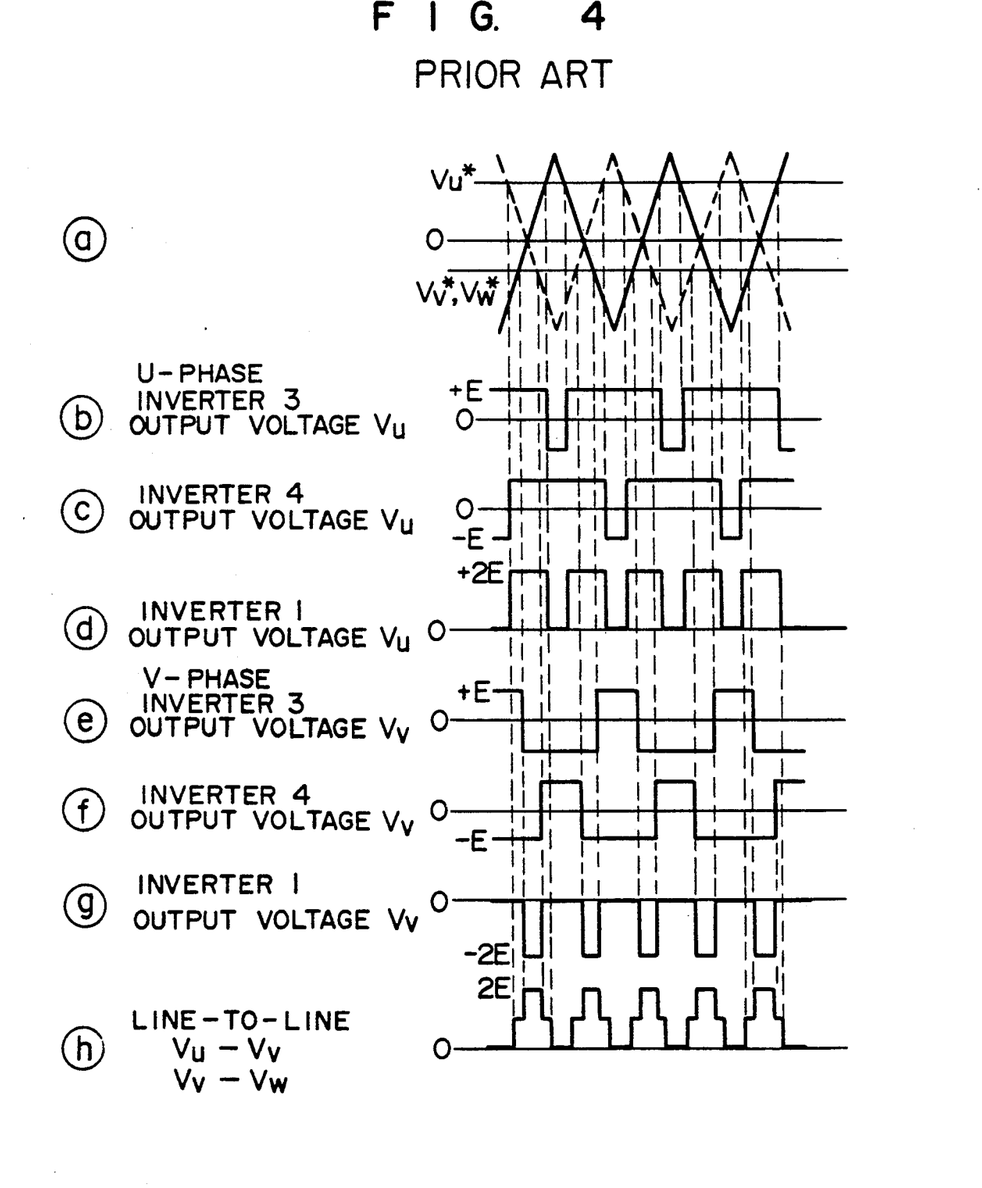
FIG. 4 is a timing chart for explaining relationships between an output voltage command signal, a carrier signal, U- and V-phase output voltages in a prior art parallel multi-inverter system.
Figure 5:
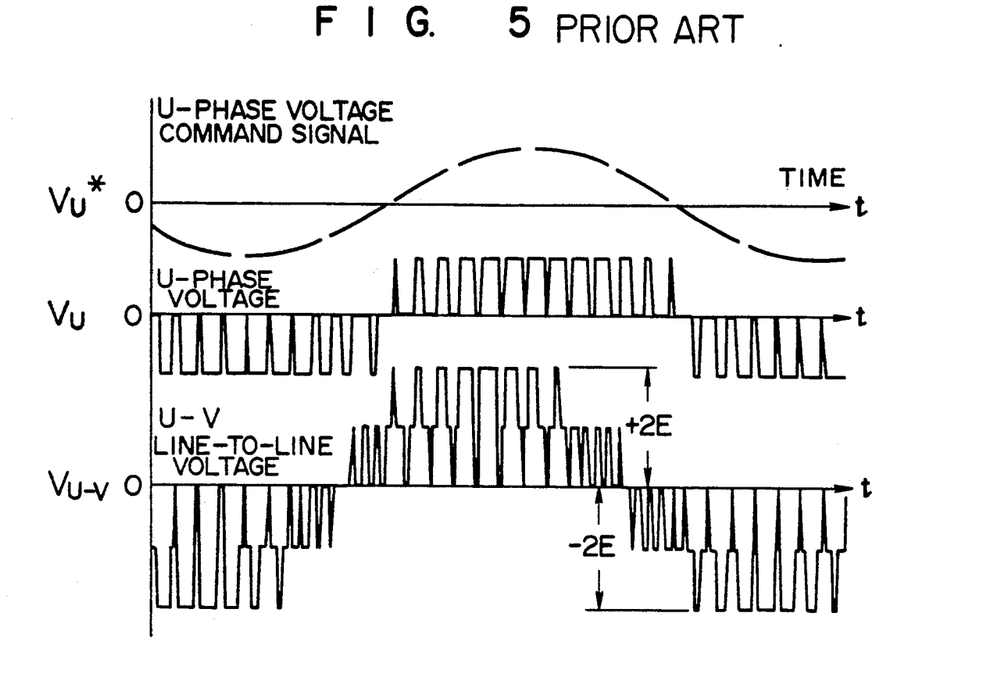
FIG. 5 shows waveforms of output voltages in the prior art parallel multi-inverter system.

Explanation will next be made as to how to minimize harmonic components in the invention of the present application. FIG. 4 is a timing chart of signals for explaining the operation of a prior art general pulse width modulation system. For simplification of description, it is assumed that such DC voltage commands as shown by a in FIG. 4 are provided to the respective phases. When the first comparator compares the U-phase voltage command signal $V_U^*$ with the carrier signal, the inverter 3 outputs such a voltage as shown by b in FIG. 4. When the second comparator compares the U-phase voltage command signal $V_U^*$ with a signal obtained by subjecting the carrier signal to an antiphase conversion, the inverter 4 outputs such a voltage as shown by c in FIG. 4. This results in that the parallel reactor 5U outputs such a voltage as shown by d in FIG. 4, which corresponds to the U-phase voltage of the inverter 1. The same operation as for the U phase holds true for the V and W phases. With respect to the V phase, the inverters 3, 4 and 1 output such voltages as shown by e, f and g in FIG. 4 respectively. As a result, a line-to-line voltage to be supplied to the AC motor 2 has three levels of 0, +E and +2E as shown in FIG. 4, h . FIG. 5 shows the waveforms of the output voltage command signal $V_U^*$, phase voltage $V_U$ and line-to-line voltage $V_{U \cdot V}$ of the parallel multi-inverter system on the prior art pulse width modulation basis. The prior art pulse width modulation system, however, has a problem that the line-to-line voltage $V_{U \cdot V}$ contains a number of harmonic components varying between ±2E, though the system can suppress the harmonic components of the phase voltage $V_U$. In FIG. 5, reference numeral symbol E denotes the voltage of each of the DC power sources 6 and 7.

Figure 6:
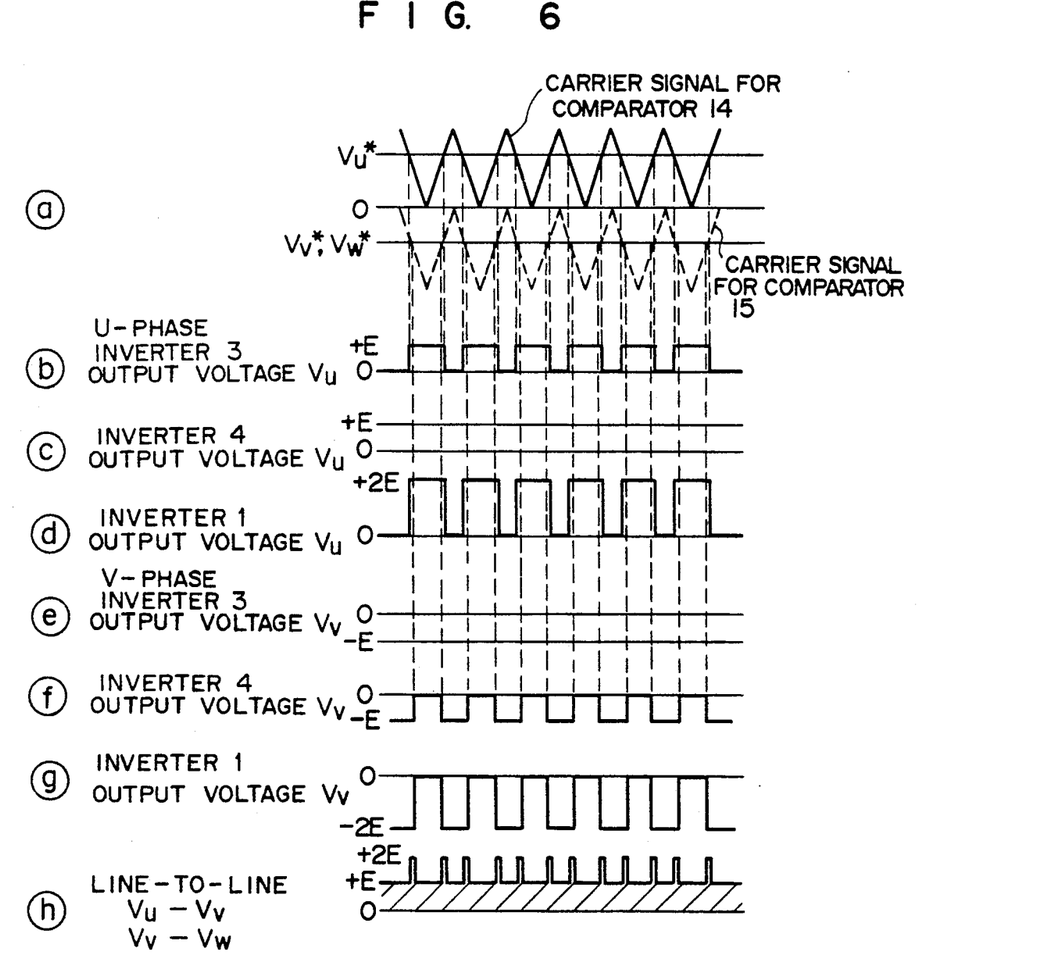
FIG. 6 is a timing chart for explaining relationships between an output voltage command signal, a carrier signal, U- and V-phase output voltages in accordance with the present invention.

Referring to FIG. 6, there is shown a timing chart for explaining the operation of the pulse width modulation system in accordance with the present invention. For simplification of description, it is assumed, as in FIG. 4, that such DC voltage commands as shown in FIG. 6, a are provided to the respective phases. When the first signal generating means compares a carrier signal shown by a solid line with the U-phase voltage command signal $V_U^*$ and when the voltage command signal $V_U^*$ is positive, the inverter 3 outputs such a voltage as shown by FIG. 6, b .

When the second signal generating means compares the carrier signal shown by the solid line with the U-phase voltage command signal $V_U^*$ and the voltage command signal $V_U^*$ is negative (which substantially corresponds to the comparison with a carrier signal shown by a broken line), the inverter 3 outputs such a voltage as shown by FIG. 6, c . Thus, the parallel reactor 5U outputs such a voltage as shown in FIG. 6, d , which corresponds to the U-phase voltage of the inverter 1. The same operation as for the U phase holds true for the V and W phases. With respect to the V phase, the inverters 3, 4 and 1 output such voltages as shown in FIG. 6, e , f , g and respectively. As a result, a line-to-line voltage to be supplied to the AC motor 2 has two levels of +E and +2E as shown in FIG. 6, h whereby less variations and less harmonic components can be advantageously realized when compared with those of the prior art system (refer to FIG. 4, h ).

Figure 7:
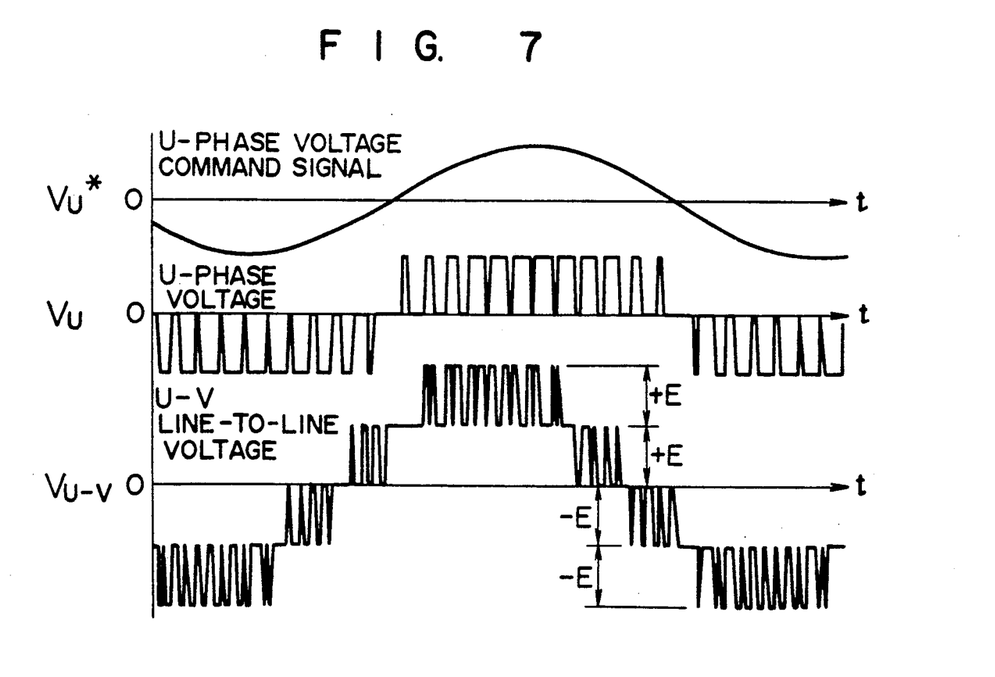
FIG. 7 shows waveforms of output voltages in accordance with the parallel multi-inverter system of the present invention.

Shown in FIG. 7 is the output voltage command signal $V_U^*$, phase voltage $V_U$ and line-to-line voltage $V_{U \cdot V}$ of the multi-inverter based on the pulse width modulation system of FIG. 1 of the present invention.

It will be readily appreciated from comparison between the present invention of FIG. 7 and the prior art of FIG. 5 that the harmonic components of the line-to-line voltage varying between ±2E can be removed with use of the pulse width modulation system of the present invention. In FIG. 7, reference symbol E denotes the voltage of each of the DC power sources 6 and 7. It goes without saying that the generation of a circulating current flowing through the parallel reactors 5U, 5V and 5W can be prevented, which forms an essential feature of the present invention.

Figure 8:
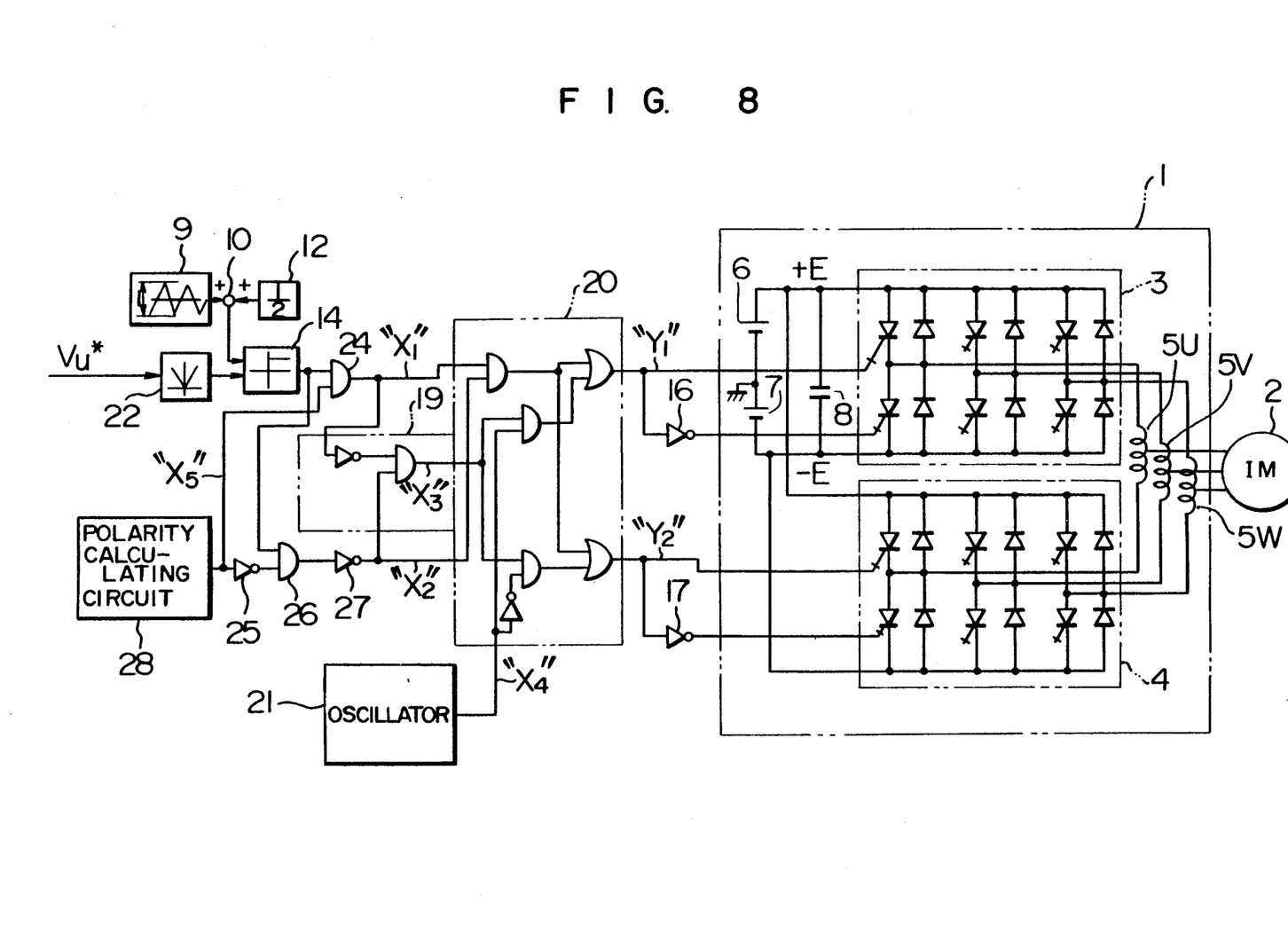
FIG. 8 is an arrangement of another embodiment of the present invention.
Figure 9:
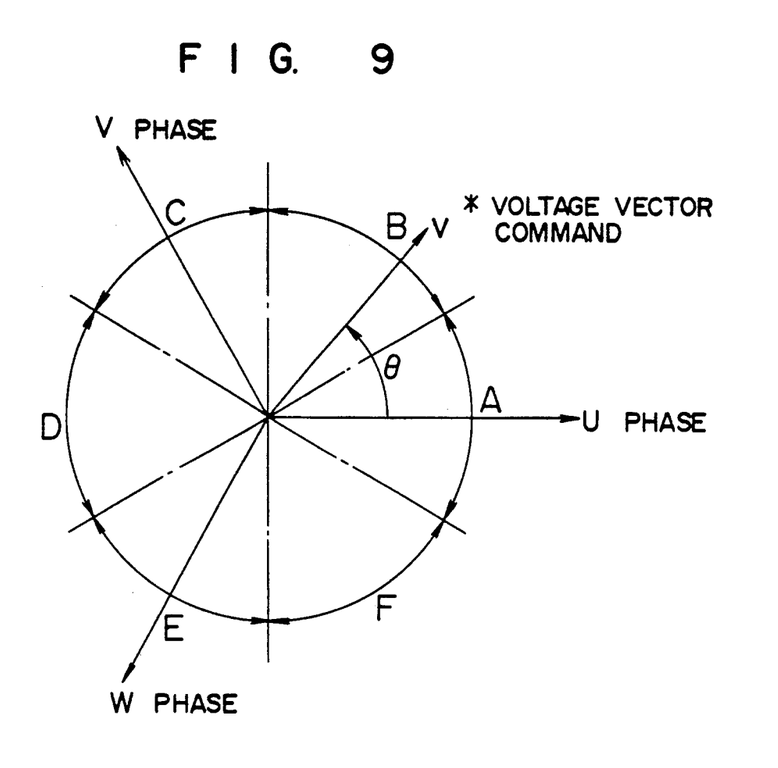
FIG. 9 is a diagrams showing relationships between respective phase output signals in the coordinate system of a stator of an AC motor.
Figure 10:
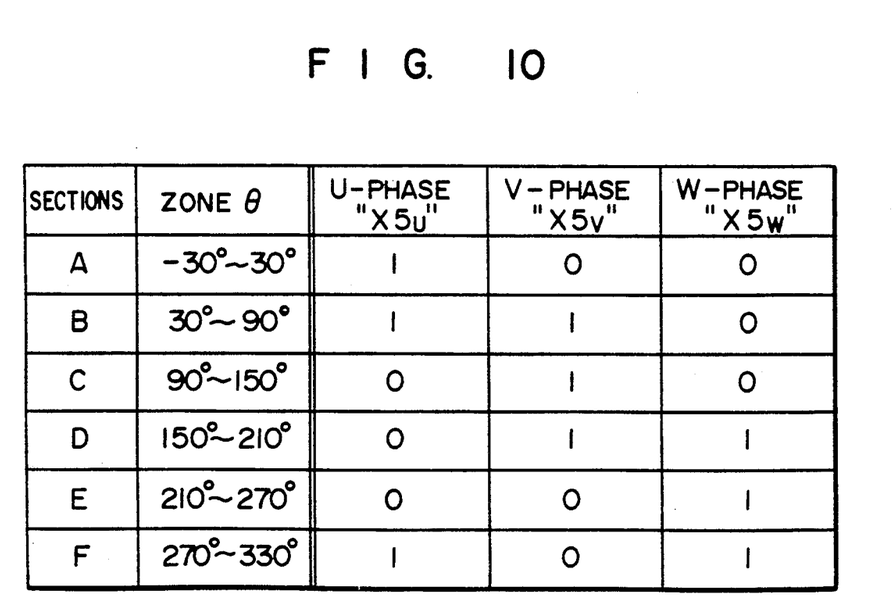
FIG. 10 is a diagram showing relationships between the respective phase output signals in the coordinate system of the AC motor stator in a tabular form.

FIG. 8 shows another embodiment of the present invention, which is different from the first embodiment of FIG. 1 in that a single polarity calculating circuit 28 is provided for the three phases to obtain polarity signals for the three phases, though the polarity discriminator 23 for voltage command has been provided for each phase to obtain polarity signals for the three phases in the first embodiment. More specifically, the operation of the polarity calculating circuit 28 will be explained in connection with FIGS. 9 and 10. FIG. 9 is a diagram showing relationships between a voltage vector command V* corresponding to a composition of the three phase output voltage commands of the multi-inverter 1 and axes of the U, V and W phase windings in the coordinate system of a stator of the AC motor 2. On the basis of one of sections A to F to which the voltage vector command V* belongs in FIG. 9, the polarities of the respective phases are determined. The values of an output signal "X5" of the polarity calculating circuit 28 with respect to the different sections and different phases are shown in FIG. 10. When the AC motor 2 is to be controlled according to a known vector control system, a phase angle of the voltage vector command V* can be easily calculated from the following equation (3).

$$\theta = \pi + \omega_1^* t + \tan^{-1}(-V_d^*V_q^*) \quad (3)$$

where $V_d^*$ and $V_q^*$ denote voltage commands in the coordinate system of rotating magnetic field of the AC motor 2, $\omega_1^*$ denotes a primary angular frequency command, and t denotes time.

In accordance with the present invention, the polarity signals can be obtained on the basis of the phase angle of the output voltage vector.

FIG. 11 shows an example in which the parallel multi-inverter system of the present invention is applied to the prior art system (JP-A-64-47277). In this example, the parallel multi-inverter 1 converts a DC voltage into an AC voltage having three levels of positive, zero and negative and supplies the three-phase AC voltages to the AC motor 2. The parallel multi-inverter 1 includes DC power sources 6 and 7, a smoothing capacitor 8, three-phase inverters 3 and 4, and parallel reactors 5U, 5V and 5W. The smoothing capacitor 8 is connected in parallel to a series circuit of the DC power sources 6 and 7, and a junction point between the DC power sources 6 and 7 is grounded. The three-phase inverters 3 and 4 are constructed by a Graetz brige self turn-off type switching elements S1U to S4W and feedback diodes D1U to D4W connected in parallel to the switching elements in polarity directions opposite to each other. Used as the self turn-off type switching elements are transistors, gate-turn-off thyristors or the like switching elements. The three-phase inverters 3 and 4 are connected at their U-, V- and W-phase AC output terminals to both ends of parallel reactors 5U, 5V and 5W each having a center tap. The parallel reactors 5U, 5V and 5W are connected at their center taps with the AC motor 2.

Next, explanation will be made as to the arrangement and operation of the PWM system of FIG. 11. In the present embodiment, explanation will be made in connection with only the U phase, but the same arrangement and operation will hold true for the V and W phases. A carrier generator 9 for generating a carrier signal for pulse width modulation control applies its output signal to adders 10 and 11. The adders 10 and 11 add outputs of constant multipliers 12 and 13 and the carrier signal from the carrier generator 9, calculate a positive-side carrier signal and a negative-side carrier signal, and apply the positive- and negative-side carrier signals to comparators 14 and 15, respectively. At this time, the positive-side carrier signal is in phase with the negative-side carrier signal. The comparators 14 and 15 usually compare the U-phase output voltage command signal $V_U^*$ with the carrier signal, and generate pulse width modulation signals (PWM pulse signals) for turning ON and OFF the switching elements S1U to S4W of the inverters 3 and 4. Provided to the comparators 14 and 15 are logical operation circuits 19 and 20 and an oscillator 21 for the purpose of suppressing such a circulating current as explained in connection with FIG. 1. The arrangements of the logical operation circuits 19 and 20 are the same as those of FIG. 1 and thus detailed explanation thereof is omitted.

In the illustrated embodiment, the input to the logical operation circuits 19 and 20 of FIG. 1, i.e., the output of the first signal generating means corresponds to the output of the comparator 14, while the output of the second signal generating means corresponds to the output of the comparator 15.

In operation of the above embodiment, an output of the parallel multi-inverter 1 is obtained from the center taps of the parallel reactors 5U, 5V and 5W, and the magnitude of the output corresponds to a sum of the output voltages of the inverters 3 and 4. Even in the present embodiment, the operations of the respective inverter phases are the same except the difference in the angle of phases, and thus explanation is made as to only the U phase. The U-phase output voltage of the parallel multi-inverter 1 varies depending on the turn ON and OFF operations of the self turn-off type switching elements S1U, S2U, S3U and S4U. More in detail, when the switching elements S1U and S3U are turned ON (with the switching elements S2U and S4U being turned OFF), the output of the inverter is a potential +E. When the switching elements S2U and S4U are turned ON (with the switching elements S1U and S3U being turned OFF), the output of the inverter is a potential −E. When the switching elements S1U and S4U or S2U and S3U are turned ON, the output of the inverter is zero potential at a neutral point of the DC power sources. In the case where the inverter output is zero potential, output signals X1 and X2 of the comparators 14 and 15 are applied to the logical operation circuit 19 which in turn outputs a signal X3 of "1" only during the zero period of the output voltage of the parallel multi-inverter 1.

The logical operation circuit 20 receives the output signals X1 and X2 of the comparators 14 and 15, the output signal X3 of the logical operation circuit 19, and an output signal X4 of the oscillation circuit 21; and outputs pulse width modulation signals Y1 and Y2 for turning ON and OFF the switching elements of the inverters 3 and 4.

The oscillation circuit 21 outputs the signal X4 which cyclically varies between 0 and 1 at a frequency lower than half of the frequency of the output signal of the oscillator 9. For example, when the oscillation frequency of the oscillation circuit 21 is set to be half the oscillation frequency of the oscillator 9 and the oscillation circuit 21 is set to be in phase with the oscillator 9, the signal X4 of the oscillator 21 varies between 0 and 1 at a period corresponding to twice the carrier frequency. That is, during a zero-potential period of the output voltage of the parallel multi-inverter 1, two modes are alternately selected when the switching elements S2U and S3U are turned ON for the signal X4 of "0" and when the switching elements S1U and S4U are turned ON for the signal X4 of "1". As a result, the present embodiment has the capability of suppressing circulating current flowing through the parallel reactor 5U, 5V, 5W between the inverters 3 and 4 and thus such harmonic components as mentioned in connection with the first embodiment can be suppressed and reduced.

Figure 12:
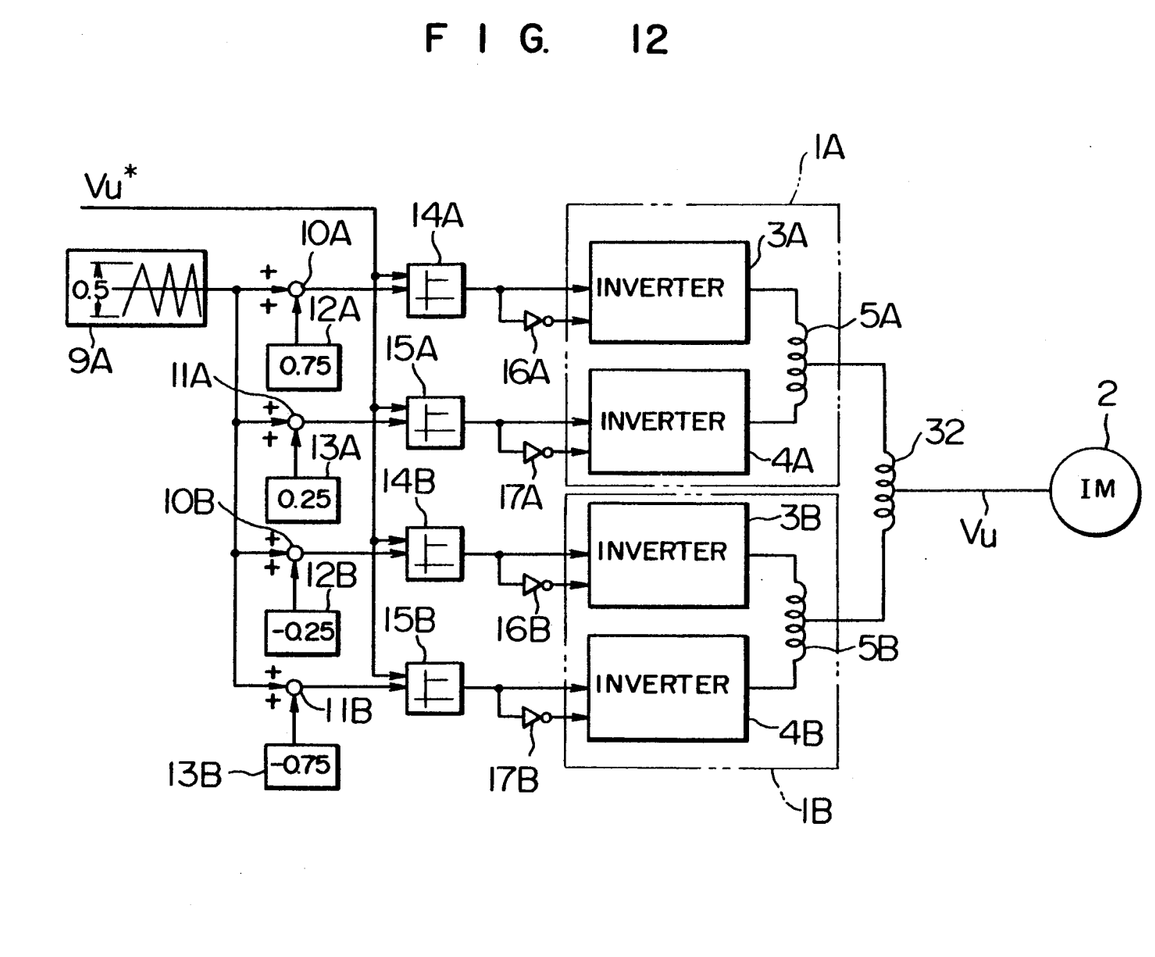
FIG. 12 is a block diagram of an example wherein the present invention is applied to a parallel 4-inverter system.

Referring to FIG. 12, there is shown yet another embodiment of the present invention, in which the same parts as those in FIG. 11 are denoted by the same reference numbers or symbols and explanation thereof is omitted. The present embodiment corresponds to an example wherein the present invention is applied to multi-inverters each including 2 inverters (4 in total) to obtain an output voltage having 5 levels of $+E$, $+E/2$, 0, $-E/2$ and $-E$. Since the same operation is performed with regard to the U, V and W phases, illustration and explanation are made as to only the U phase. An AC motor 2 is supplied with an average of output voltages of parallel multi-inverters 1A and 1B from a center tap of a parallel reactor 32. The parallel multi-inverter 1A includes inverters 3A and 4A, and a parallel reactor 5A; while the parallel multi-inverter 1B includes inverters 3B and 4B, and a parallel reactor 5B. The inverters 3A, 4A, 3B and 4B are controlled on the basis of output signals of comparators 14A, 15A, 14B and 15B respectively. The comparators 14A, 15A, 14B and 15B receive a common U-phase output voltage command signal $V_U{}^*$ and respective carrier signals sent from adders 10A, 11A, 10B and 11B, respectively. The adders 10A, 11A, 10B and 11B add a common output signal of an oscillator 9A to respective biasing signals sent from constant multipliers 12A, 13A, 12B and 13B, respectively.

Figure 13:
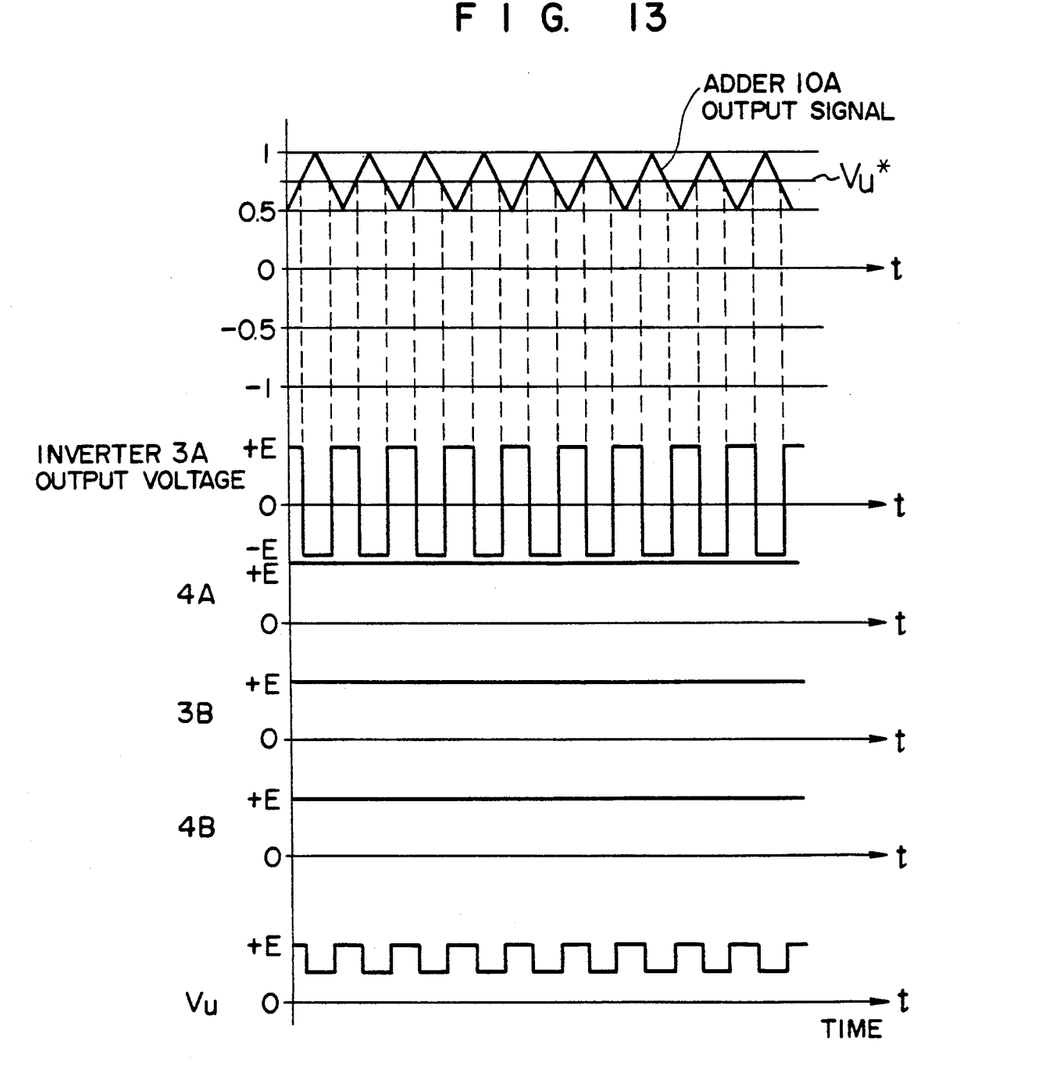
FIGS. 13 and 14 are timing charts of output signals appearing at various points in the circuit of FIG. 12.

The operation of the above embodiment will next be explained by referring to FIGS. 13 and 14. FIG. 13 shows waveforms of outputs of the inverters when the U-phase output voltage command signal $V_U{}^*$ is above 0.5. The signal $V_U{}^*$ having a value of 1.0 corresponds to the inverter maximum output voltage. When the voltage command signal $V_U{}^*$ is above 0.5, the comparators 15A, 14B and 15B other than the comparator 14A generate output signals of "1" and thus the inverters 4A, 3B and 4B all generate the output voltage of $+B$. This results in that an output voltage $V_U{}^*$ of the parallel reactor 32 has two levels varying between $+B$ and $+E/2$.

Figure 14:
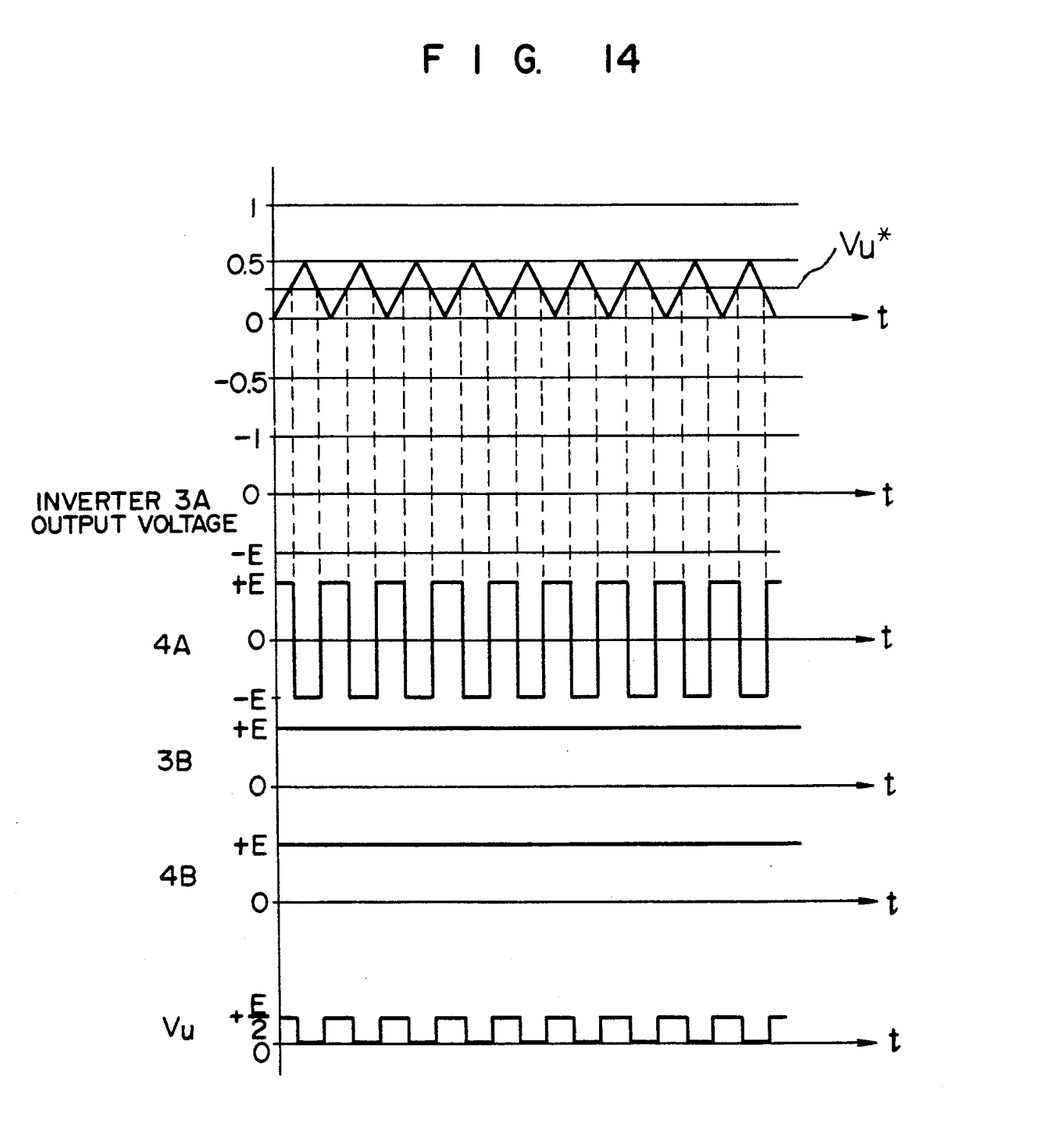

Shown in FIG. 14 are waveforms of outputs of the inverters when the U-phase output voltage command signal $V_U{}^*$ varies between 0 and 0.5. In this case, the comparator 14A generates an output signal of "0", the comparators 14B and 15B generate output signals of both "1", the inverter 3A generates an output voltage of $-E$, and the inverters 3B and 4B generate output voltages of both $+E$. As a result, the output voltage $V_U$ of the parallel reactor 32 has two levels of $+E/2$ and 0. Through the above operation, the two multi-inverters generate the output voltage $V_U$ having 5 levels of $+E$, $+E/2$, 0, $-E/2$ and $-E$. In addition, under 4-inverter PWM control of FIG. 12, like the 2-inverter PWM control of the foregoing embodiments, the harmonic components contained in a line-to-line voltage can be further reduced.

Figure 15:
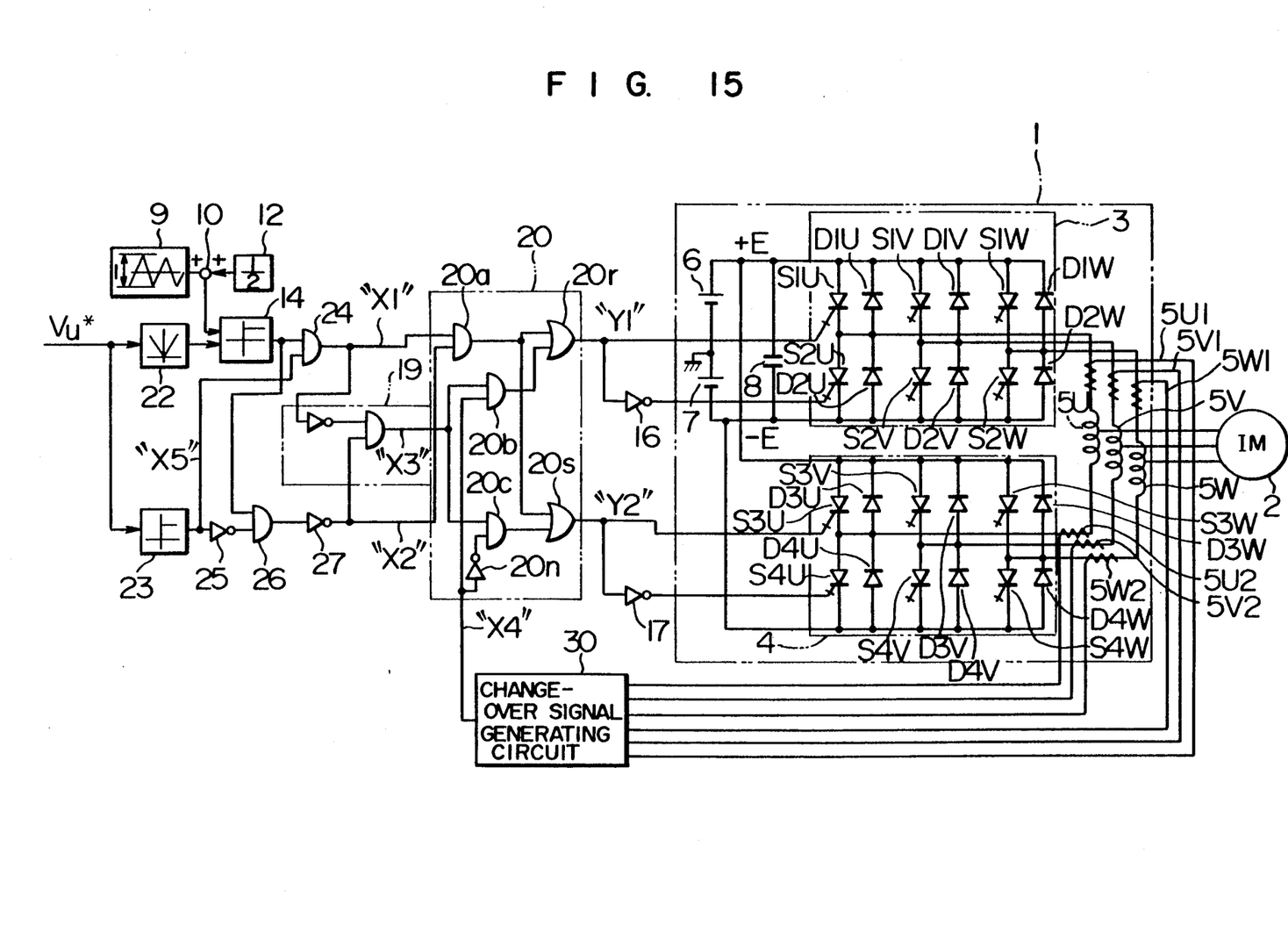
FIG. 15 is an arrangement of yet another embodiment of the present invention to prevent the circulating current.

Yet a further embodiment of the present invention is shown in FIG. 15 in which the same parts as those in FIG. 1 are denoted by the same reference numerals and symbols and explanation thereof is omitted. In the circuit configuration of FIG. 1, the two sorts of switching modes are switched at intervals of a constant period so that the output voltage becomes zero when the output of the first signal generating means is different from that of the second generating means. Whereas, in the present embodiment, current detectors 5U1, 5U2, 5V1, 5V2, 5W1 and 5W2 are provided at both ends of parallel reactors 5U, 5V and 5W respectively to detect the directions or senses of currents flowing through the reactors; and a change-over signal generating circuit 30 is provided to generate a change-over signal for switching of the switching modes in such a manner that the current senses become opposite to each other on the basis of the detected sense results. In the illustrated embodiment, the current detectors are provided so as to detect the currents of the respective reactors at their both ends. However, it is of course sufficient to detect the currents of the reactors at only one ends and detect the currents of the load sides. It is also possible to change over the switching modes according to the magnitudes of the detected currents.

As has been disclosed in the foregoing, when a parallel multi-inverter system in accordance with the present invention is employed, harmonic components contained in a line-to-line voltage can be reduced and a circulating current can be prevented from flowing through the parallel reactors provided to interconnect the inverters of the multi-inverter system during each zero potential period of the output voltage.

What is claimed is:

1. A parallel multi-inverter system including a plurality of inverters connected to each other through parallel reactors to convert a DC voltage of a DC power source into an AC voltage according to phase output voltage command signal, said system further comprising:

an absolute-value circuit for inverting a negative part of said output voltage command signal into positive;

a comparison circuit for comparing an output of said absolute-value circuit with a carrier signal;

a polarity discrimination circuit for discriminating a polarity of the output voltage command signal;

a first AND circuit for performing a logical AND operation of an output of said polarity discrimination circuit and an output of said comparison circuit;

a polarity inversion circuit for inverting the output of the polarity discrimination circuit; and a second AND circuit for performing a logical AND of an output of said polarity inversion circuit and the output of the comparison circuit, wherein an output voltage of said multi-inverter system is controlled according to an output signal of said second AND circuit.

2. A parallel multi-inverter system as set forth in claim 1, wherein the output voltage of said multi-inverter system is positive when the outputs of said first and second AND circuits are both positive, the output voltage of the multi-inverter system is negative when the outputs of the first and second AND circuits are both negative, and is zero when the outputs of the first and second AND circuits are different from each other.

3. A parallel multi-inverter system as set forth in claim 2, further comprising inversion circuits for inverting the output signals of the first and second AND circuits at a predetermined period when the output signals of the first and second AND circuits are different from each other respectively.

* * * * *